United States Patent [19]

Peterson

[11] 3,997,135
[45] Dec. 14, 1976

[54] MANEUVERABLE AUXILIARY VEHICLE

[76] Inventor: Peterson, 5040 Sheriff Road, NE., Washington, D.C. 20003

[22] Filed: June 4, 1975

[21] Appl. No.: 583,722

Related U.S. Application Data

[63] Continuation of Ser. No. 405,217, Oct. 10, 1973, abandoned.

[52] U.S. Cl. .......................... 244/137 R; 180/1 FV; 180/1 P
[51] Int. Cl.² .......................................... B64D 1/08
[58] Field of Search ......... 244/137 R, 17.19, 17.21, 244/17.11, 2, 137 P; 180/1 FV, 1 P, 7 P, 116, 117, 775, 79.2 B, 79.2 C

[56] References Cited

UNITED STATES PATENTS

| | | | |
|---|---|---|---|
| 992,726 | 5/1911 | Madden | 244/17.19 |
| 1,521,047 | 12/1924 | Reynolds | 244/17.21 |
| 2,366,321 | 1/1945 | Ferro | 244/2 |
| 3,265,142 | 8/1966 | Winter | 180/117 |
| 3,390,735 | 7/1968 | Medley et al. | 180/79.2 B |

FOREIGN PATENTS OR APPLICATIONS 1,812,118  8/1970  Germany ..................... 244/137 R

*Primary Examiner*—Stephen G. Kunin
*Attorney, Agent, or Firm*—Pollock, Vande Sande & Priddy

[57] ABSTRACT

A maneuverable vehicle which is adapted to be suspended from above, such as by a helicopter. The vehicle is particularly adapted for use in rescue work. The vehicle has a pair of rudders, one at each end thereof. A propeller is associated with each of the rudders to produce an airflow across the associated rudder. This airflow enables positioning of the rudder to control the vehicle. The vehicle is completely enclosed to protect its occupants from the environment and falling objects. A slidig door allows ingress and egress from the vehicle. The draft created by the propellers also powers an air treatment system to clear smoke and other fumes from the interior of the vehicle. Suitable bumpers, shock absorbers and lights are provided to enable the vehicle to be safely used in the environment for which it is intended.

3 Claims, 4 Drawing Figures

MANEUVERABLE AUXILIARY VEHICLE

This is a continuation, of application Ser. No. 405,217 filed Oct. 10, 1973.

BACKGROUND OF THE INVENTION

As the environment, in which man lives and works, changes so must the apparatus which he utilizes to make his environment safe, change as well. Years ago when homes, offices and factories were simple one and two-story structures, there was no necessity for specialized rescue apparatus. However, as these structures began to grow, the need arose for specialized apparatus in order that man's presence in these structures could be made as safe as possible. The ladder, extensible ladder, and vehicle-mounted extensible ladder were invented in order to aid in the rescue of persons trapped in multi-story structures by reason of fire or otherwise. However, it is not uncommon today for buildings to be so high as to make impossible the use of any practical ladder for rescue. Indeed, in the downtown areas of most modern cities, buildings of this size are the rule and not the exception. Therefore, new apparatus was required to enable the rescue of these persons.

The helicopter has added a new dimension to the rescue possibilities. Now, rescue is possible from above as well as from below. However, unless the trapped individuals can reach a location at which a helicopter can land, such as the roof of a building, some auxiliary apparatus is required to enable these individuals to be rescued from the interior floors of a building. And even where individuals can reach the roof of a building, most buildings are not designed to carry the load of a helicopter and therefore such a vehicle cannot safely land to rescue to individuals. Such auxiliary apparatus is known to the prior art and includes slings, ropes, chairs and a simple platform such as is disclosed in the Andrews, U.S. Pat. No. 3,273,651. However, there are problems associated with this type of apparatus. The use of ropes, slings, chairs, and platforms suspended from a helicopter to the rescue individuals can cause the rescue operation itself to be dangerous. Furthermore, this apparatus does not protect the individual from the environment, such as smoke or other fumes, nor from harm from falling objects. In addition, ropes, slings, chairs, and platforms, when suspended from a helicopter, are difficult to maneuver to the desired location. One reason for this is the substantial downdraft created by a helicopter which can cause objects suspended from the helicopter to gyrate in an erratic manner.

SUMMARY OF THE INVENTION

The present invention overcomes the difficulties and disadvantages associated with the prior art by providing a maneuverable auxiliary apparatus which is adapted to be supported from above. The maneuvering capability of this apparatus enables the operator of the auxiliary craft to properly position it so as to safely rescue individuals in distress notwithstanding the downwash of a supporting helicopter or natural winds. Furthermore, the auxiliary craft is enclosed to protect the occupants from smoke and fumes in the environment and potentially dangerous falling objects. An air exhaust system is provided to clear the atmosphere contained in the vehicle. Furthermore, since it is expected that the vehicle would be maneuvered in close proximity to a building for safe ingress and egress, suitable bumpers are provided to cushion the shocks caused by the vehicle impacting the building. Suitable sliding door apparatus is included so that while the vehicle can at times be completely enclosed, entry and exit is possible. Both warning and illumination lights are provided on the vehicle. The warning lights facilitate the location of the vehicle for those in the helicopter and those on the ground. The illumination lights provide illumination for the area surrounding the vehicle to enable the vehicle operator to properly position it and to enable individuals to enter or exit from the vehicle with illumination.

BRIEF DESCRIPTION OF THE DRAWINGS

The invention will be described in reference to the attached drawings in which like reference characters identify identical apparatus and in which.

DETAILED DESCRIPTION OF THE DRAWINGS

Figure 1:
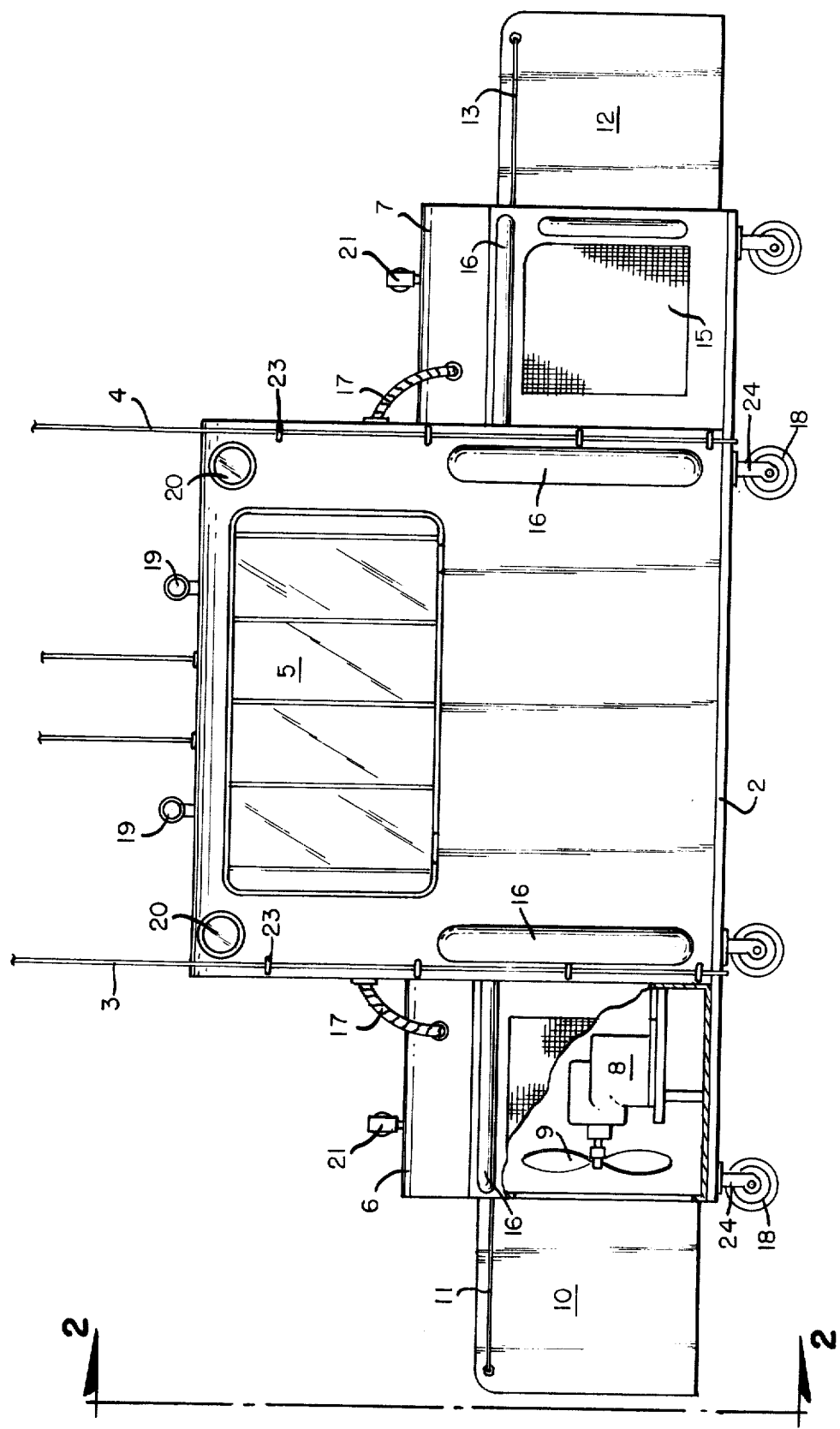
FIG. 1 is a front view, partially broken away of the vehicle.

As shown in FIG. 1, the vehicle comprises a supporting floor 2 and a housing or cabin 1. The vehicle is adapted to be supported from above, such as by a helicopter, via cable pairs 3 and 4. The cables are held in guides 23 and support the floor 2. The cables run around the bottom of floor 2 to form a U-shaped sling-like configuration. The cable guides 23 may be integral with or welded to the cabin 1. The floor 2 can be an integral load-supporting structure or it may be a composite of load-supporting members and a floor supported thereby. In any event, the cabin or housing 1 is supported by the floor 2. In addition, smaller housings 6 and 7, located at each end of the housing 1, are also supported by the floor 2. Each of the housings 6 and 7 has a prime mover 8 mounted therein. Prime mover 8 may be an internal combustion engine, a diesel engine, or an electric motor. In any event, the prime mover 8 is coupled to and provides driving force for propellers 9. Pinned for rotatable movement to each of the housings 6 and 7 is a rudder 10 and 12. The angular relationship between the rudder 10 and the vehicle can be controlled from the interior of the vehicle by means of control lines 11. In a like manner, the angular relationship of rudder 12 with respect to the vehicle can be controlled, from the interior of the vehicle, by control cables 13. A portion of each of the housings 6 and 7 comprises screens 15 on either side of the engine compartments. The screens 15 may be solid so as to channel the entire airflow across the rudders. As is well understood in the art, the airflow, caused by motion of the propellers 9, across the rudders 10 and 12 allows the position of the rudders 10 and 12 to control the vehicle or to change its angular positioning. The same airflow induced by propellers 9 is also utilized to exhaust the cabin 1 of smoke or other fumes through pneumatic couplings 17 connecting the interior of the cabin 1 with the draft induced by motion of the propellers 9.

When the vehicle is not in use it rests on a plurality of wheels 18 which are coupled to and support the floor 2 through shock absorbers 24. The shock absorbers coupling the wheels 18 to the floor 2 reduce the transmission of the shock to the cabin 1 when the vehicle is in the transition from being supported from above to being supported from below.

Mounted on cabin 1 and the housings 6 and 7 are a plurality of lights. Illumination lights 19 are provided to illuminate the surrounding area so that persons desiring to use the vehicle, and the vehicle operator have sufficient illumination to operate. In addition, warning lights 20 and 21 provide for easy and rapid identification of the position of the vehicle by individuals located on the ground or in the helicopter supporting the vehicle, when the vehicle is in use. Power sources for these lights may be batteries carried by the vehicle or generators or alternators driven by prime movers 8.

Since it is contemplated that the vehicle may be required to be in intimate contact with the surface of a building, when suspended from a helicopter, suitable bumpers 16 are provided on both faces of the vehicle. These bumpers 16 are shown in FIG. 1 and in FIG. 2.

The cabin or housing 1 includes a number of fixed windows which are not shown in FIG. 1. It also includes a sliding door 5 which can be opened to allow ingress and egress from the vehicle. As shown in FIG. 1 the sliding door 5 is preferably formed at least partially out of transparent material. A preferred embodiment of the door 5 slides downwardly into the shell of the housing 1. Of course it will be readily apparent to those skilled in the art that the door 5 can slide either to the left or to the right, or, if desired, upwardly into the shell of housing 1.

Figure 2:
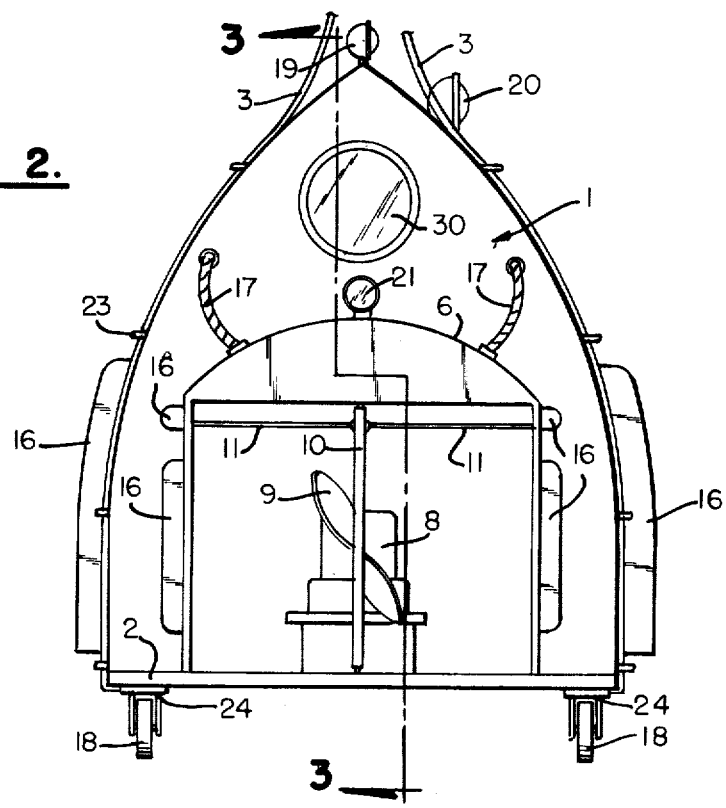
FIG. 2 is an end view of the vehicle.

FIG. 2 shows an end view of the vehicle and in particular illustrates the manner in which the bumpers 16 are located on the vehicle. In addition, one of the fixed windows or viewing ports 30 is also shown in FIG. 2.

Figure 3:
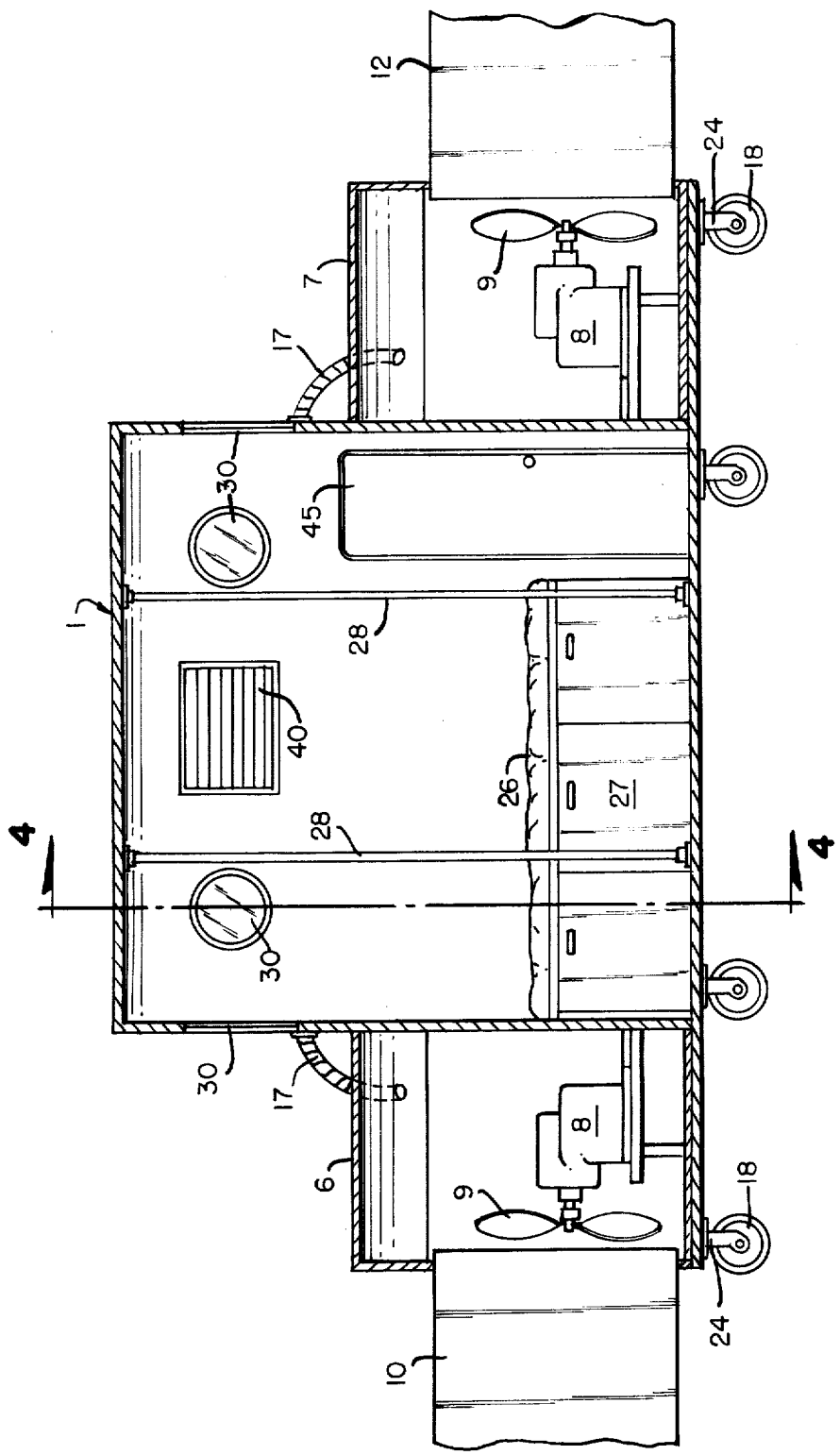
FIG. 3 is a section taken on lines 3—3 in FIG. 2.

FIG. 3 is a cross-sectional view of FIG. 2 taken on lines 3—3 of FIG. 2 and in particular shows the interior of the housing or cabin 1. Additional fixed viewing ports 30 can clearly be seen in FIG. 3. In addition, the two occupant supports 28 are illustrated. The interior of the cabin provides seating space 26 and if desired, seat belts and other safety devices can be provided. The seating space 26 may extend across the width of the vehicle at the end opposite door 45.

Below the seating space 26 storage space 27 is included. This storage space can be used for storage of tools required in rescue work such as crowbars, hammers, flashlights, ropes, and grapling hooks, and the like. A door 45 provides means for ingress and egress from the vehicle when it is at rest.

Figure 4:
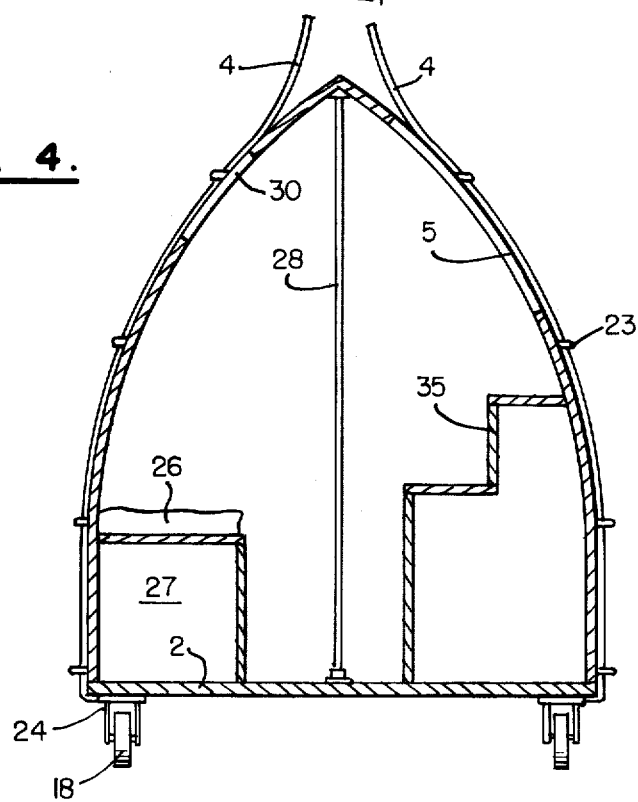
FIG. 4 is a sectional view taken on lines 4—4 of FIG. 3.

FIG. 4 is a cross-sectional view of FIG. 3 taken on lines 4—4. FIG. 4 shows, in addition to the apparatus already referred to, the relationship of the sliding door 5 and steps 35 on the interior of the vehicle. When the sliding door is opened to allow ingress and egress, the steps 35 assist the individuals entering and exiting from the vehicle.

OPERATION

When the vehicle is intended to be used an operator will enter the vehicle through the door 45 when it is stationary on the ground. If the vehicle is intended to be used as a work platform, other workers may also enter along with the operator. The door 45 is then closed.

With the vehicle thus occupied, the supporting cables can be attached to the coupling means 3 and 4 and are fed through guides 23. The supporting cables are then attached to a helicopter or other lifting apparatus and the vehicle is lifted. Other lifting apparatus which could be used include a crane or other fixed lifting device. The vehicle may carry batteries to power the lights and engines, if electric motors are utilized. Alternatively, power cables can also be fed to the vehicles from the supporting apparatus to power this equipment. If the propeller driving means 8 comprises internal combustion engines or diesel engines, the vehicle will preferably carry its own fuel source. Alternatively, fuel can be pumped to the vehicle from supporting structures.

The vehicle then is raised to its operating altitude by the supporting apparatus. The attitude, or angular relationship of the vehicle, can be controlled by the operator. As has been explained before the propellers 9, when operated, provide a draft which enables the positioning of the rudders 10 and 12 to control the attitude or angular relationship of the vehicle. The angular relationship of the vehicle is varied by rotating the rudders 10 and 12. These rudders may be rotated, from within the vehicle, by the operator selectively operating the control cables 11 and 13. As is well known, varying the pitch of the propellers enables the vehicle to move forwardly or rearwardly under control of the operator. When the vehicle is in its proper position, both altitude-wise and attitude-wise, the sliding door 5 is opened. In this condition individuals can safely exit from or enter the vehicle. In this condition the bumpers 16 provide the necessary shock absorbing apparatus to cushion the impact between the vehicle and any stationary structure such as a building. It will be appreciated that the rudders 10 and 12 enable the attitude of the vehicle to be controlled in relation to a building face notwithstanding the downwash which may exist from any supporting helicopter. It should be apparent that in fire rescue work, considerable smoke and fumes may enter the vehicle during the rescue operation. The draft produced by the propellers 9 and coupled to the interior of the vehicle by the coupling houses 17 enables the vehicle atmosphere to be cleared of this material. Fresh air can enter through the vent 40 contained in the housing 1.

When the rescue operation is complete, and the individuals to be rescued occupy the vehicle, the sliding door 5 may be closed and the vehicle then lowered safely to the ground.

It should be apparent to those skilled in the art that the vehicle does not necessarily have to be lowered to the ground immediately adjacent the buildings from which the individuals were rescued but they can be transported by the supporting helicopter to any other safe location. Furthermore, the use of the vehicle is not limited to rescue operations from large buildings in cities but can also be employed as an aid for rescue operation in mountainous or winderness areas. In particular, the maneuvering capability of the vehicle enables it to be utilized in close quarters. The vehicle can avoid trees and other stationary items which would hinder or to make it impossible for a helicopter to enter the same areas.

What I claim is:

1. Emergency rescue apparatus for the rescue of persons from buildings and other areas comprising:
  a substantially enclosed cabin means for housing persons and having at least one closable entranceway for the ingress and egress of persons and being incapable of self-propulsion along its longitudinal axis.
  a plurality of cables attached to said cabin means for supporting and transporting said cabin means by a helicopter or the like to a position adjacent an external sidewall of a building where a rescue operation is to be effected.

force applying means at each end of said cabin means for exerting a variable horizontal force component on the relevant end of said cabin means with a direction transverse to the longitudinal axis of said cabin means, and control means acting on each said force exerting means to control the magnitude of said transverse force component acting on said cabin means, said force applying means and said control means being effective to selectively rotate said cabin means about a vertical axis or to move said cabin means translationly in a direction transverse to its said longitudinal axis, whereby said cabin means when positioned by the helicopter or the like adjacent the external wall of the building may be selectively rotated in position about a vertical axis or moved in translation laterally relative to its longitudinal axis so as to move said cabin means closely adjacent and parallel to said external wall to facilitate the movement of persons between said cabin means and the building.

2. The rescue apparatus of claim 1 in which said control means includes a first means acting on said force applying means at the forward end of said cabin means to vary the force component effective on the forward end of said cabin means and a second means acting on said force applying means at the rear end of said cabin means to vary the force component effective on the rear end of said cabin means.

3. The rescue apparatus of claim 1 wherein said force exerting means at each end of said cabin means comprises air draft inducing means and a rudder member positioned to have the resulting air draft impinge thereon, said control means being located in said cabin means and being coupled to each said rudder means to control the position thereof.

* * * * *

UNITED STATES PATENT AND TRADEMARK OFFICE
CERTIFICATE OF CORRECTION

PATENT NO. : 3,997,135
DATED : December 14, 1976
INVENTOR(S) : Curfield Peterson It is certified that error appears in the above—identified patent and that said Letters Patent are hereby corrected as shown below:

The name of the inventor
in item [76] should appear as follows:

Curfield Peterson

Signed and Sealed this

First Day of March 1977

[SEAL]

Attest:

RUTH C. MASON
*Attesting Officer*

C. MARSHALL DANN
*Commissioner of Patents and Trademarks*